SEALING MEANS FOR SPLIT MEMBERS OF ROTARY MECHANICAL FACE SEALS

Filed Nov. 16, 1960 5 Sheets-Sheet 1

Inventor: Samuel C. W. Wilkinson
By Kenyon, Palmer & Stewart
Attorneys

June 8, 1965 S. C. W. WILKINSON 3,188,096

SEALING MEANS FOR SPLIT MEMBERS OF ROTARY MECHANICAL FACE SEALS

Filed Nov. 16, 1960 5 Sheets-Sheet 2

Inventor: Samuel C. W. Wilkinson
By Kemon, Palmer & Stewart
Attorneys

June 8, 1965 S. C. W. WILKINSON 3,188,096

SEALING MEANS FOR SPLIT MEMBERS OF ROTARY MECHANICAL FACE SEALS

Filed Nov. 16, 1960 5 Sheets-Sheet 3

Inventor: Samuel C. W. Wilkinson
By Kemon, Palmer & Stewart
Attorneys

June 8, 1965 S. C. W. WILKINSON 3,188,096

SEALING MEANS FOR SPLIT MEMBERS OF ROTARY MECHANICAL FACE SEALS

Filed Nov. 16, 1960 5 Sheets-Sheet 4

Inventor:
Samuel C. W. Wilkinson
By Haman, Palmer & Stewart
Attorneys

June 8, 1965 S. C. W. WILKINSON 3,188,096
SEALING MEANS FOR SPLIT MEMBERS OF ROTARY MECHANICAL FACE SEALS
Filed Nov. 16, 1960 5 Sheets-Sheet 5
Fig. 11
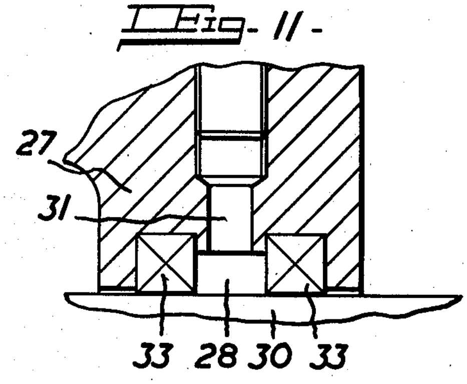
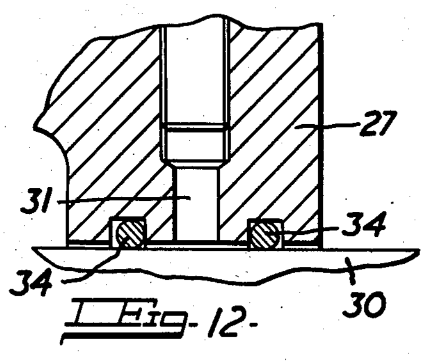
Fig. 12
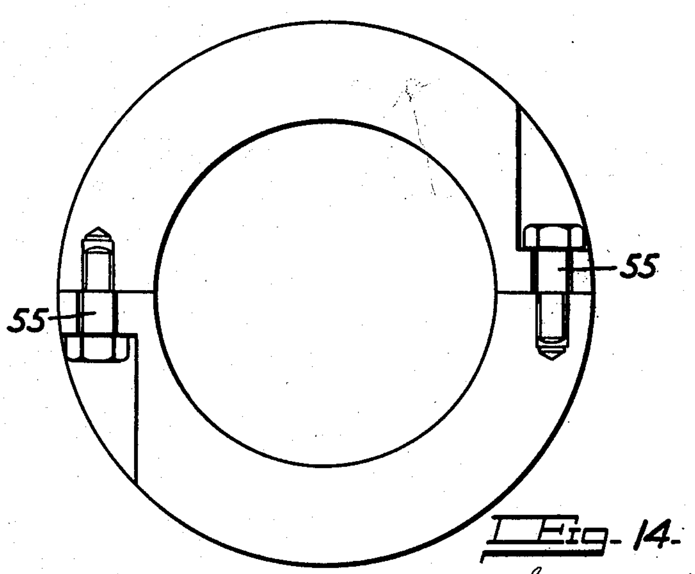
Fig. 14
Inventor: Samuel C. W. Wilkinson
Attorneys: Kemon, Palmer & Stewart United States Patent Office 3,188,096 Patented June 8, 1965

3,188,096

SEALING MEANS FOR SPLIT MEMBERS OF ROTARY MECHANICAL FACE SEALS

Samuel Clifford Walter Wilkinson, Cookham, England, assignor to Crane Packing Limited, Slough, England Filed Nov. 16, 1960, Ser. No. 69,654
Claims priority, application Great Britain, Nov. 17, 1959, 38,890/59
9 Claims. (Cl. 277—59)

This invention is concerned with rotary mechanical seals of the kind designed to form a fluid-tight seal between relatively rotatable members, for example between the driving shaft of a fluid pump and the pump housing. It is known to make such seals in a split form, that is to say each of the ring-shaped members making up the seal assembly and liable to require replacement in time is split into two or more arcuate portions so that they can be assembled onto the shaft without necessitating access to a free end of the shaft. This split form of seal, whilst simplifying seal replacement on assembled machinery, raises extra difficulties in that it increases the number of potential paths for leakage of the fluid by providing a possible leakage path between the butting ends of the arcuate sections.

It is an aim of the invention to eliminate this and other potential sources of leakage in split seals. According to the invention an annular space is provided in one or both of the mutually opposed surfaces of one of the split members and of another member, split or not, into or onto which it fits, and, after assembly of the seal, this space is filled with a sealing compound. The annular space is conveniently formed by a rectangular groove machined or otherwise formed in one of the members. The sealing compound is inserted through a radial hole in this member or in the other one, and the hole is then sealed with a plug.

The method of sealing the split members according to the invention may be applied both to the fixed and rotating members. Where one of the two seal faces of a face seal is allowed axial movement under spring pressure, the sealing compound may be used to seal that moving face with respect to the part, e.g. the shaft, with respect to the part, e.g. the shaft, with respect to which it has axial movement.

In its simplest from, as applied to the non-rotating part of a face seal, in which the seal face member fits into a metal ring which is secured to an inner face of the pump or other housing, the object of the invention may be achieved simply by forming a groove of rectangular section in the external cylindrical surface of the face member (which is split into, say, two semi-circular sections), and providing a threaded radial hole in the ring, sealable by a screwed plug. After assembly of the seal, a sealing compound is injected through the hole to fill the groove.

The sealing compound not only forms a fluid-tight joint between the seal face and the ring but also has the important function of forcing the sections of the face together in an even manner such as can only be achieved by a flowable material under pressure, that is to say the compound acts like a stressed hoop around the sections, holding them in contact with one another and ensuring that no leakage takes place between their mating ends.

To prevent leakage of the sealing compound between the ring and seal face, packing rings may be used, or O-rings in grooves provided in one member or the other. A further possibility is to provide seals of U-section at the ends of the groove. In each case the sealing ring has to be interrupted to enable it to be assembled, and the break is preferably in the form of a scarf joint to minimise leakage of sealing compound through the joint.

Where the joint at which leakage is to be prevented is that between the rotating part of the seal and the shaft on which that rotating part has small axial movement under spring pressure, the groove may be in the inner cylindrical surface of that rotating part, i.e. facing the shaft, and the sealing compound could be in contact with the shaft, the ends of the groove being sealed by O-rings, U-rings or other packing rings mentioned above, or the shaft could be engaged by the base of single U-ring which occupies the open side of the groove section and is urged against the shaft by the sealing compound.

The invention will now be further described with reference to the accompanying drawings which show various examples of seals embodying the construction according to the invention. In these drawings:

FIGURES 9 to 12 are similar views showing ways of sealing a split rotating member to the shaft;

FIGURE 13 is a longitudinal section through one half of a rotary shaft seal embodying three separate split sections sealed in the manner according to the invention; and FIGURE 14 shows the manner in which certain of the members in FIGURE 13 are secured together.

Figure 1:
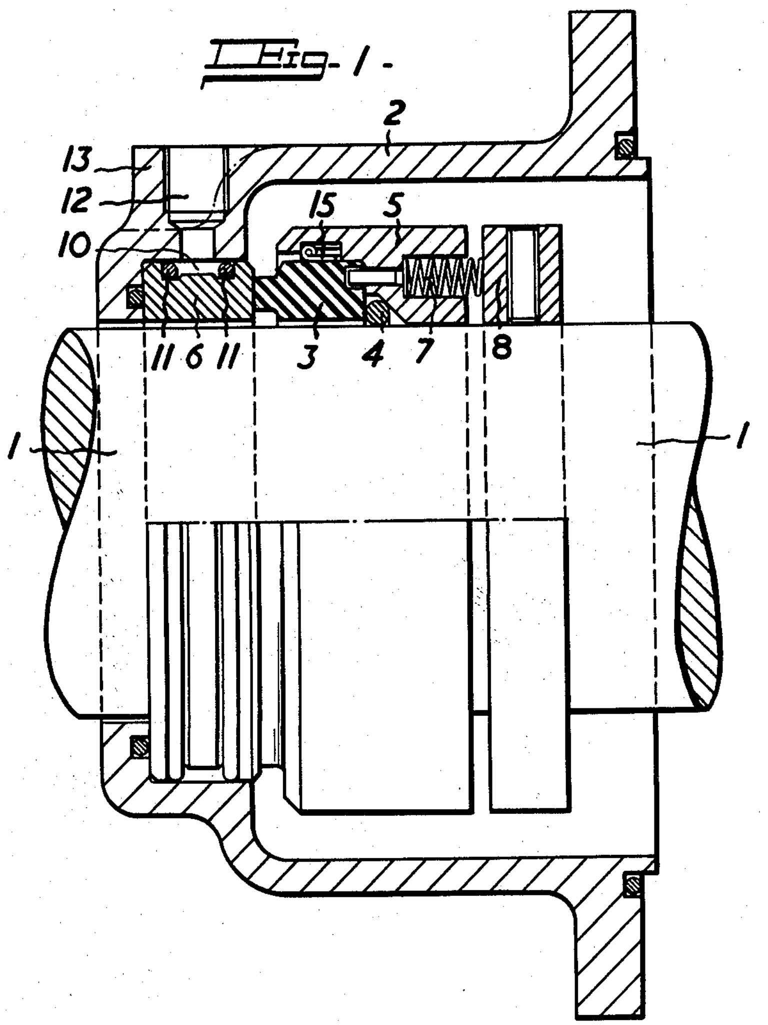
FIGURE 1 is an axial section through a rotary shaft seal in which the stationary seal face member is sealed in the manner according to the invention, the section being taken on the line 1—1 in FIGURE 2.

Referring first to FIGURES 1 to 4, a shaft 1, for example the driving shaft of a pump, rotates in a housing 2 and the leakage of fluid is prevented by a rotary shaft seal comprising a rotating seal face member 3, made for example of carbon, mounted on the shaft and sealed to it by an O-ring 4. The member is driven by a sleeve 5 and urged axially against a non-rotating ring 6 in the housing 2 by means of springs 7 abutting against a ring 8 secured to the shaft.

Figures 2, 3:
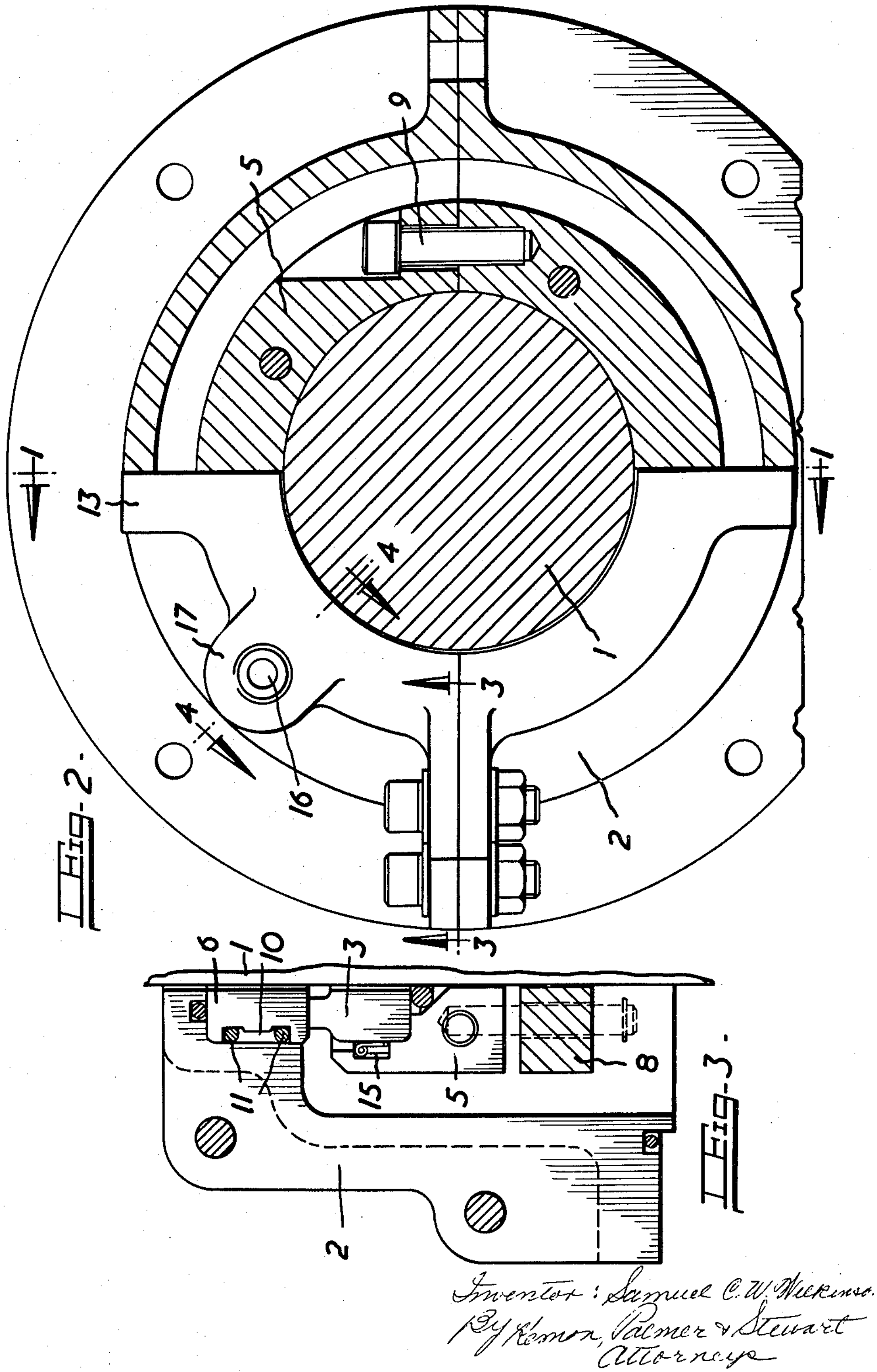
FIGURE 2 is a view looking along the axis of the seal of FIGURE 1, the right hand half being shown in section.
FIGURE 3 is a section on the line 3—3 in FIGURE 2.

The rotating and non-rotating seal face members 3 and 6 will be subjected to wear and will require replacement at intervals. Where it is difficult to obtain access to the end of the shaft, it is known to arrange for these members to be split, usually into two sections, the housing 2 being likewise split in a diametral plane as indicated in FIGURE 2. This enables the housing to be taken off the shaft and for the members 3 and 6 to be likewise taken off and replaced without having to be slipped over the end of the shaft. In the embodiment of FIGURES 1 to 4, the member 5 is also split into two sections secured together by tangential screws of which one is visible at 9 in FIGURE 2.

The usual drawback of such a construction is the risk of leakage between the ends of the two sections of each member. In the case of the non-rotating seal face member 6 this is overcome in the manner according to the invention by the provision in its outer cylindrical surface of a groove 10 of substantially rectangular cross-section. When the member 6 is inserted into the recess provided for it in the housing 2 and annular rectangular passage is left sealed at its front and rear faces by O-rings 11. After assembly of the seal, including insertion of the two halves of the member 6 a viscous sealing compound is injected into the passage 10 through a radial connection 12 provided in a boss 13 on the housing 2. This not only has the function of sealing the member 6 into the housing 2, but also it provides an inward loop stress pressing the two halves of the member 6 together ensuring that there is no gap for leakage of the fluid between the ends of the two halves.

After injection of the fluid the connection 12 is sealed by a threaded plug (not shown) which maintains the compound in the passage 10 under pressure.

The rotating seal face member 3, instead of being sealed by a compound has its two sections urged together by means of hairpin-like lever springs 15 fitting between the outer surface of the member 3 and a groove machined in the sleeve 5 which is held together by the screws 9 mentioned earlier.

Figure 4:
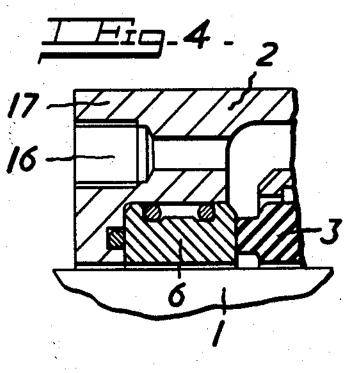
FIGURE 4 is a section on the line 4—4 in FIGURE 2.

FIGURE 4 shows the provision of an axially extending connection 16 in a boss 17 on the housing 2 for feeding in a supply of cooling fluid to the seal in a known manner, the fluid being the same as that against which the seal acts.

Figure 5:
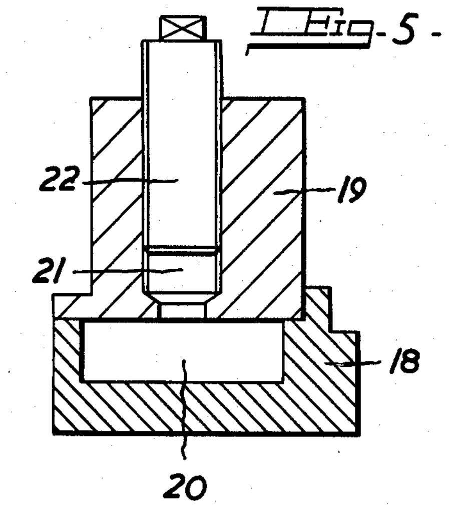
FIGURES 5 to 8 are scrap sections showing different ways in which a split non-rotating seal face member may be sealed to the member in which it is mounted to avoid leakage of the compound.
Figure 7:
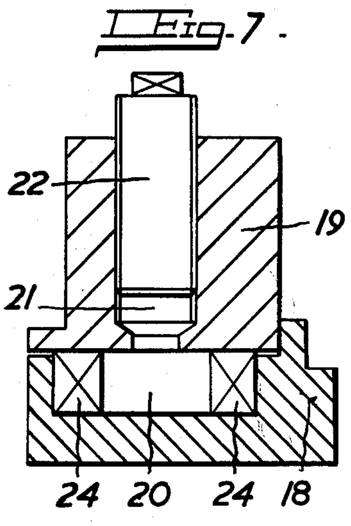
Figure 6:
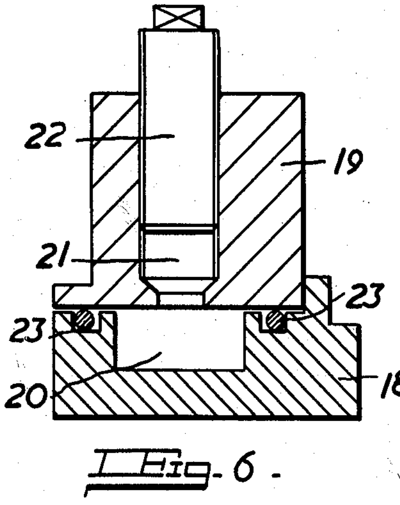

Turning now to FIGURES 5 to 8, these show various ways in which the passage provided for the sealing compound in a split non-rotating seal face member may itself be sealed against leakage. In each case a split non-rotating seal face member 18 is received in a portion 19 of the housing and is provided with a groove 20 in its outer surface in a manner similar to the member 6 of FIGURES 1 to 4. FIGURE 5 shows an arrangement without any special provisions for sealing against escape of fluid and the fluid is fed in through a connection 21 which is afterwards closed by a threaded plug 22. In FIGURE 6 additional grooves are provided in the outer face of the member 18 to receive O-rings 23 which prevent the escape of fluid. In the embodiment of FIGURE 7 the sealing is achieved by packings 24 of rectangular section, and in FIGURE 8 it is achieved by opposed rubber seals 25 of U-shaped cross-section. There is also an O-ring 26.

It will be understood that in each of the examples described where there is an O-ring or U-section ring or other packing, this must be broken at one point in its periphery in order to enable it to be assembled onto the shaft and the cut is preferably in the form of a scarf joint, i.e. is made at an acute angle to the tangent to the ring.

Figures 9, 13:
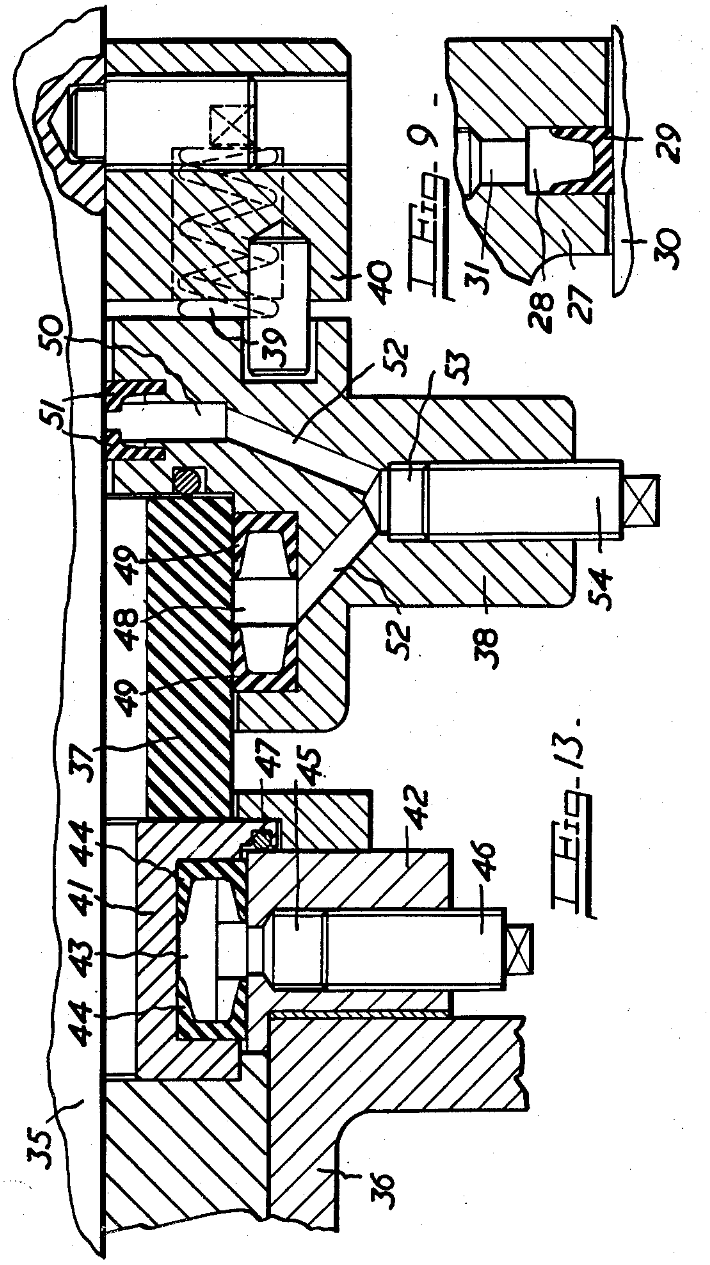

FIGURES 9 to 12 show the application of the invention to the problem of sealing a spring-loaded face to the shaft. Here relative axial movement must be allowed between the member and the shaft. In FIGURE 9 the seal face member 27 is provided on its inner cylindrical surface with a deep annular groove 28 receiving a rubber or similar seal of U-section 29 which is pressed against the shaft 30 by a viscous sealing compound injected into the groove 28 through a connection 31 which is afterwards sealed by a threaded plug (not shown). The compound presses the flexible member 29 against the shaft without preventing small relative axial movements between the member 27 and the shaft 30.

Figure 10:
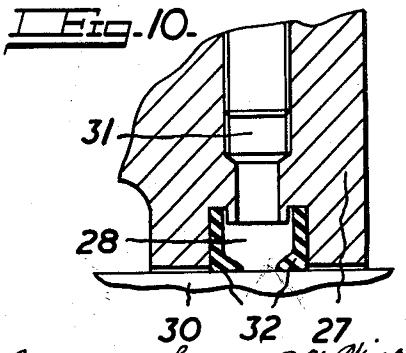

FIGURE 10 shows an arrangement similar to FIGURE 9 and the same reference numerals have been used where applicable, but in place of the single U-shaped seal 29 there are two seals 32 in the ends of the groove, and the compound is allowed to come into direct contact with the shaft between them.

FIGURE 11 shows a further modification in which the members 32 are replaced by packings 33 of square cross-section.

In FIGURE 12 the groove 28 is eliminated and the compound simply fills the space between the member 27 and the shaft 30.

FIGURE 13 shows a seal embodying the arrangement according to the invention in three different places. A shaft 35 rotating in a housing 36 has a split rotating seal face member 37, for example of carbon, mounted in a split sleeve 38 which is urged axially by springs 39 abutting against a ring 40 secured to the shaft 35. The rotating seal face member 37 is pressed against a split non-rotating seal face member 41 mounted in a ring 42 secured to the housing 36.

Figure 8:
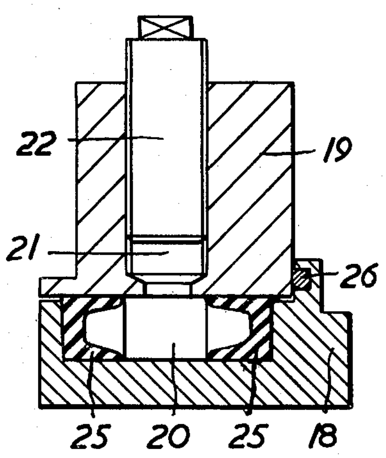

The sealing of the non-rotating member 41 into the ring 42 is achieved in exactly the same manner as shown in FIGURE 8 in that a groove 43 for receiving the compound has its ends sealed by rubber seals 44 of U-shaped cross-section, the compound being inserted through a connection 45 in the ring 42 closed by a plug 46. There is also an O-ring 47 corresponding to the O-ring 26 of FIGURE 8.

The split rotating seal face member 37 is sealed into the sleeve 38 in a similar manner by the provision of a groove 48 machined in the sleeve 38 to receive the sealing compound, the end of the groove being sealed by U-seciton rubber rings 49. The sleeve 38 is sealed to the shaft 35 in a manner similar to that shown in FIGURE 10, i.e. to allow axial movement between the sleeve 38 and the shaft 35, a grove 50 in the sleeve 38 having its ends closed by rubber rings 51 of L-section.

The viscous sealing compound is fed to the grooves 48 and 50, after assembly of the seal, through passages 52 from a common connection 53 closed by a plug 54.

Each of the members 42, 38 and 40 is constructed in two halves, as shown in FIGURE 14, the halves being secured together by tangential set screws 55. The members 41 and 37 are similarly formed in two halves but without the halves being secured together by bolts. Instead the halves are clamped together by the pressure of the sealing compound in the grooves 43 and 48 respectively.

In each of the arrangements described, continuous pressure may be applied to the sealing compound to prevent the formation of voids on any slight loss of compound that might occur over long periods of time. This may be achieved by including a spring-loaded plunger in the plug 12, 22, 46 or 54, or by including a resiliently yielding member, such as of foam plastic or an air-filled sealed rubber bag within the space occupied by the sealing compound.

I claim:

1. A rotary mechanical face seal assembly comprising a non-rotating housing, a shaft rotatable therein, a first ring-shaped seal face member embracing said shaft, a fluid-tight connection between said first member and said shaft, a second ring-shaped seal face member embracing said shaft, a fluid-tight seal between said second member and said housing, said first member being associated with said shaft to rotate therewith and said second member being associated with said housing in non-rotating relationship therewith, and said first and second seal face members being in mutual face-to-face rubbing contact over radially extending faces thereof, said second ring-shaped seal face member being received in a recess in said housing and being formed of a plurality of arcuate separable sections, and being further provided with an external annular groove forming an annular space between said second member and said housing, and said housing being provided with a closable passage from the outside thereof, communicating with said space, and a viscous sealing compound within and completely filling said groove.

2. A rotary mechanical face seal assembly comprising a non-rotating housing, a shaft rotatable therein, first and second ring-shaped seal face members, said members embracing said shaft, means urging said members into mutual face-to-face rubbing contact over radially extending faces thereof, means sealing said first member to said housing and preventing rotation of that member, means sealing said second member to said shaft, means causing that member to rotate with the shaft, said first member being received in a recess in said housing and being formed of a plurality of arcuate segments in end-to-end abutting relationship and said first member being further provided with a groove in its external surface that mates with said recess, and a viscous sealing compound occupying said groove under pressure, thereby sealing said first member into said recess and binding together the segments thereof.

3. A rotary mechanical face seal assembly comprising a non-rotating housing, a shaft rotatable therein, first and second ring-shaped seal face members, said members embracing said shaft, means urging said members into mutual face-to-face rubbing contact over radially extending faces thereof, means sealing said first member to said housing and preventing rotation of that member, means sealing said second member to said shaft, means causing said second member to rotate with the shaft, said second member being formed of a plurality of arcuate segments in end-to-end abutting relationship, a sleeve rotatable with said shaft and provided with a cylindrical recess in which said second member is received, an annular groove in the cylindrical wall of said recess, and a viscous sealing compound under pressure in said groove serving to hold together the segments of said second member and to seal said second member in said recess.

4. A rotary mechanical face seal assembly as in claim 3, including sealing rings occupying opposite ends of said groove.

5. A rotary mechanical face seal assembly as in claim 3, wherein said sleeve comprises a plurality of arcuate segments in end-to-end abutting relationship and is provided on its inner cylindrical surface with an annular groove, and a viscous sealing compound filling said last-mentioned groove under pressure and serving to seal said sleeve to said shaft.

6. A rotary mechanical face seal assembly as in claim 3, wherein said sleeve comprises a plurality of arcuate segments in end-to-end abutting relationship and is provided on its inner cylindrical surface with an annular groove, mechanical means holding said segments together, and a viscous sealing compound filling said last-mentioned groove under pressure and serving to seal said sleeve to said shaft.

7. A rotary mechanical face seal assembly comprising a second ring-shaped seal face members, said members non-rotating housing, a shaft rotatable therein, first and embracing said shaft, means urging said members into mutual face-to-face rubbing contact over radially extending faces thereof, means sealing said first member to said housing and preventing rotation of that member, means sealing said second member to said shaft, means causing that member to rotate with the shaft, a sleeve embracing said shaft and provided with a cylindrical recess in which said second seal face member is received, said sleeve comprising a plurality of arcuate segments in end-to-end abutting relationship and being provided with an internal groove abutting said shaft, and a viscous sealing compound filling said groove under pressure and sealing said sleeve to said shaft.

8. A rotary mechanical face seal assembly as in claim 7 including mechanical means holding said segments together.

9. A rotary mechanical face seal assembly as in claim 7, wherein said sleeve is capable of axial movement with respect to said shaft.

References Cited by the Examiner

UNITED STATES PATENTS

| | | | |
|---|---|---|---|
| 2,331,641 | 10/43 | Walker | 286—9 |
| 2,531,079 | 11/50 | Payne | 277—16 |
| 2,731,282 | 1/56 | McManus et al. | 277—59 XR |
| 2,810,592 | 10/57 | Williams | 286—9 XR |
| 2,928,685 | 3/60 | Tracy | 277—70 |

FOREIGN PATENTS

| | | |
|---|---|---|
| 756,725 | 9/56 | Great Britain. |

LEWIS J. LENNY, *Primary Examiner.*

MORRIS M. FRITZ, EDWARD V. BENHAM, *Examiners.*